C. H. HAPGOOD.
WEIGHING SCALE.
APPLICATION FILED OCT. 23, 1913.
1,104,496.
Patented July 21, 1914.
5 SHEETS—SHEET 2.
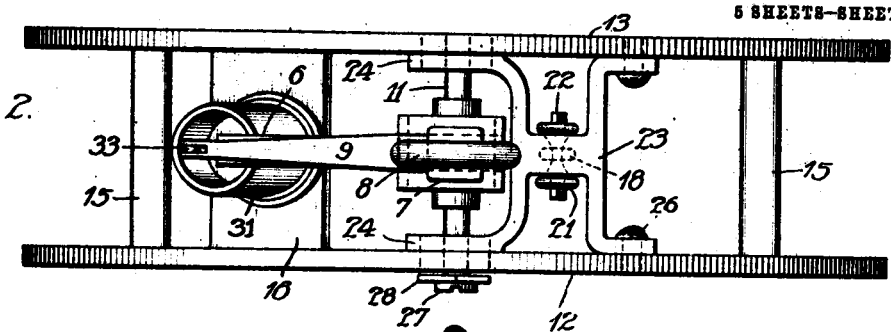
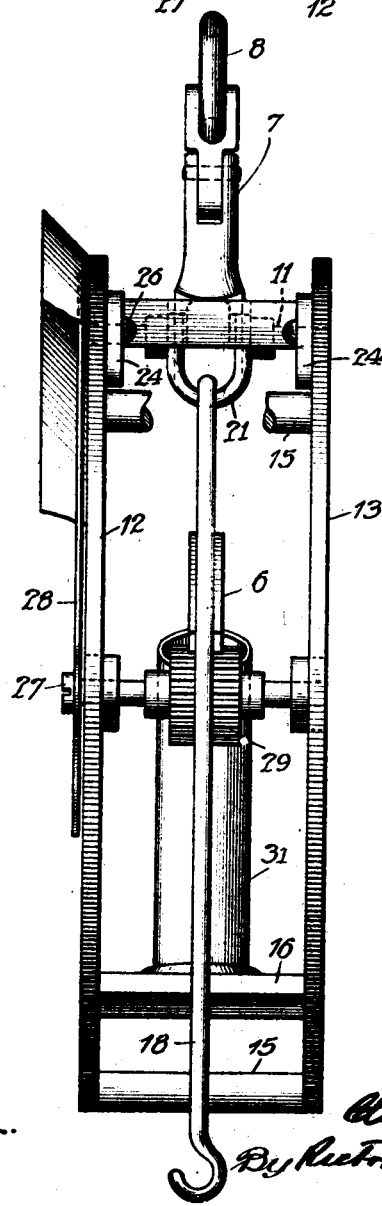

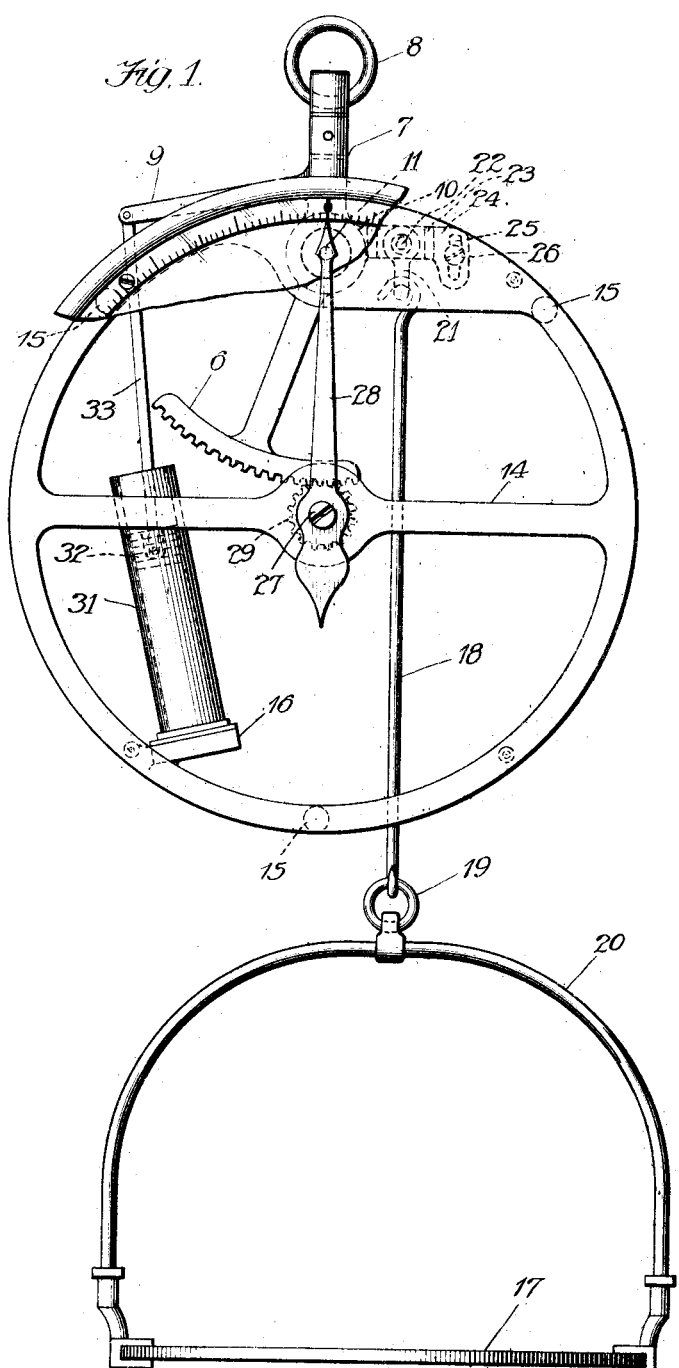

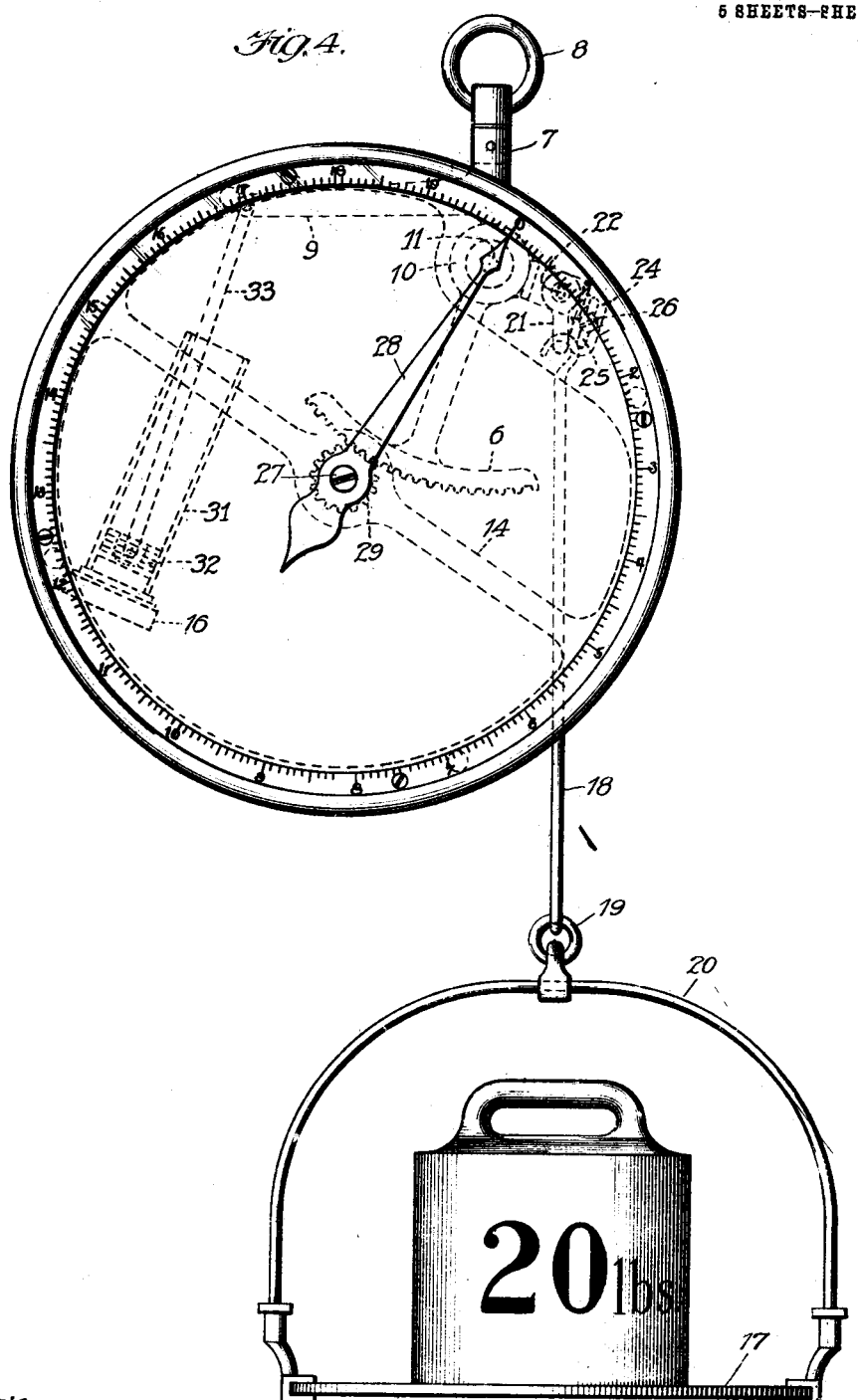

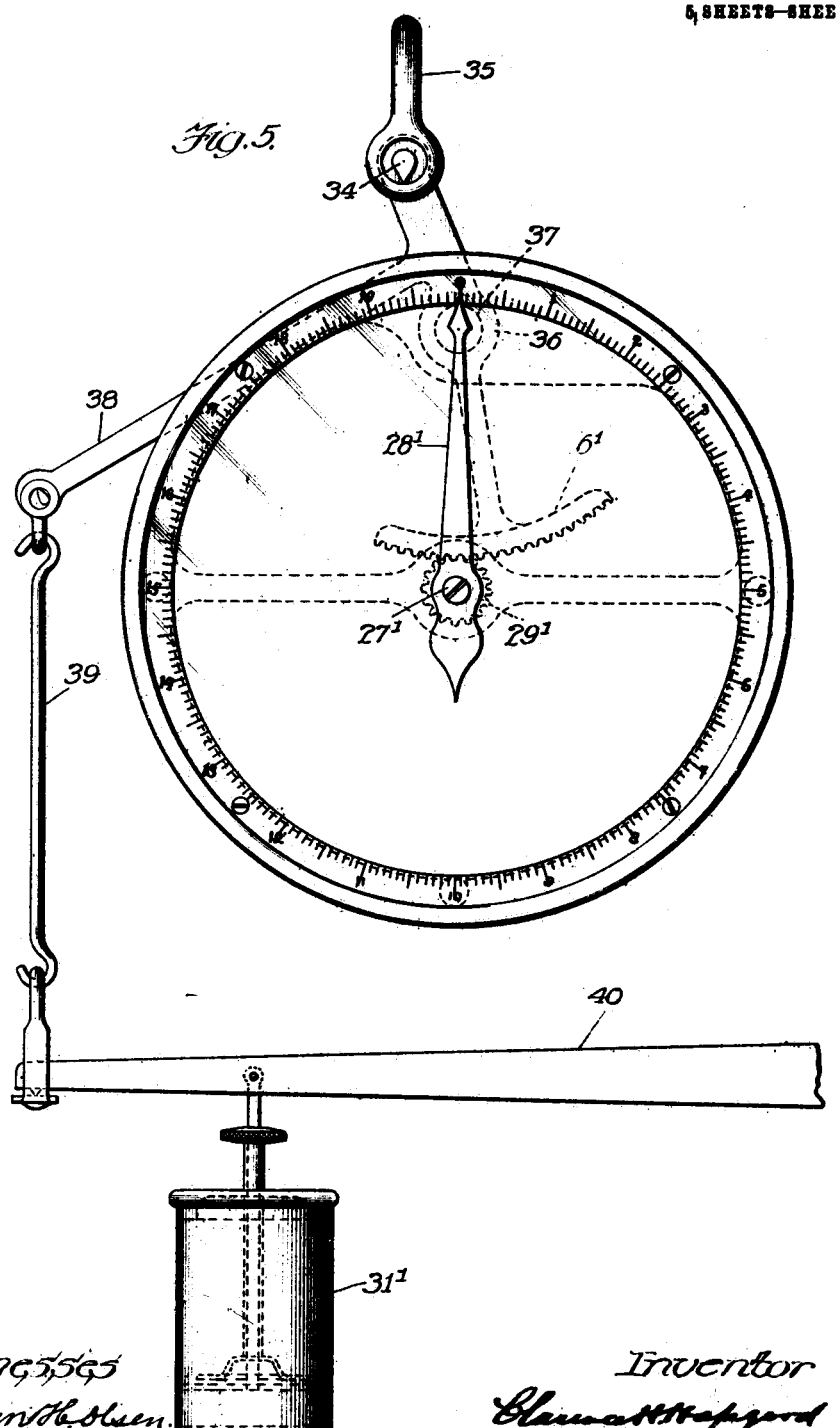

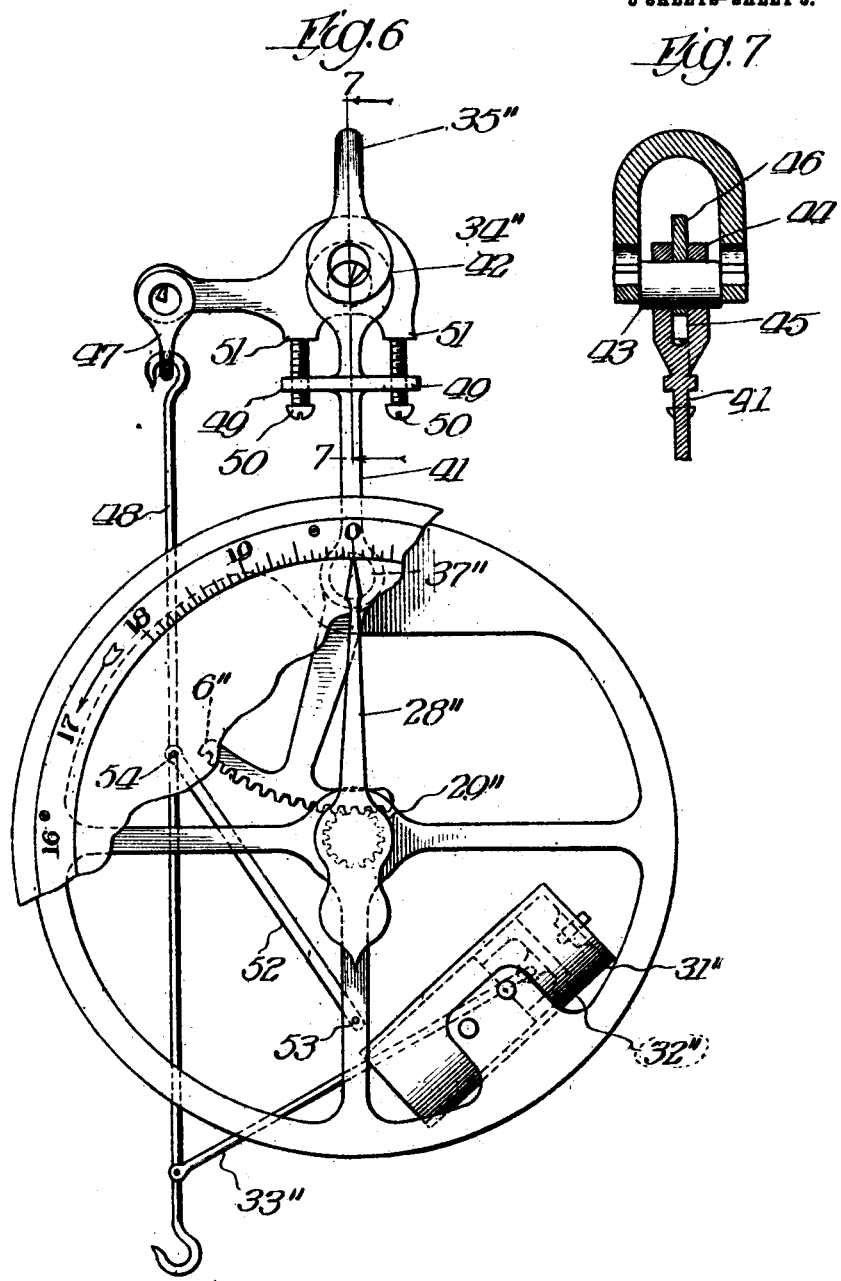

UNITED STATES PATENT OFFICE.

LARENCE H. HAPGOOD, OF TOLEDO, OHIO, ASSIGNOR TO TOLEDO SCALE COMPANY, OF JERSEY CITY, NEW JERSEY, A CORPORATION OF NEW JERSEY.

WEIGHING-SCALE.

1,104,496.  Specification of Letters Patent.  Patented July 21, 1914.

Application filed October 23, 1913. Serial No. 796,791.

*To all whom it may concern:*

Be it known that I, CLARENCE H. HAPGOOD, a citizen of the United States, residing at Toledo, in the county of Lucas and State of Ohio, have invented certain new and useful Improvements in Weighing-Scales, of which the following is a specification.

My invention relates more particularly to automatic scales of the pendulum type in which when a load is placed upon the platform the pendulum, which forms the load offsetting means, is displaced from its normal position to an extent sufficient to counterbalance or offset the weight of the load on the platform. In the forms of scales heretofore devised the pendulum has taken the form of a separate and distinct element so connected to the scale pan or scale beam, as the case might be, and to the weight-indicating mechanism as to perform its intended function.

In the present invention I dispense with the employment of a pendulum as a separate element from the rest of the construction and utilize the indicator casing and the parts mounted therein for this purpose.

The advantages of the construction are many but chief among them may be mentioned that it dispenses with the weight of the separate pendulum thus relieving the bearings and also providing a construction which can be readily shipped and subjected to unusual abuse without affecting the bearings or the accuracy of the device.

In the accompanying drawings I have shown and in the following specification described in detail preferred forms of my invention but it is to be understood that the specific disclosure is for the purpose of exemplification only and that the scope of the invention is to be found in the following claims in which I have endeavored to distinguish the same from the prior art so far as known to me without, however, abandoning or relinquishing any portion thereof.

Turning now to the drawings, Figure 1 is an elevation of a preferred form of my invention as applied to a hanging scale, showing the casing broken away, however, in order to disclose more clearly the interior parts; Figs. 2 and 3, plan and side elevations respectively, of the same on a somewhat enlarged scale; Fig. 4, a view similar to Fig. 1 showing the casing intact; however, and with the parts of the device in a different position; Fig. 5 a front view in elevation of a second form of the invention shown as applied to a beam scale; Fig. 6, a front elevation partly broken away of a third form of the invention; and Fig. 7 a vertical section in the plane of the line 7—6 at right angles to the plane of Fig. 6.

The same symbol of reference is applied to each part wherever it occurs throughout the several views.

Referring now to the form of construction shown in Figs. 1 to 4, inclusive, the scale is shown to comprise a casting composed of a gear segment 6, a stem 7, which receives the ring 8 by which the scale is suspended, an arm 9 to which the piston rod of the dashpot, to be presently described, is connected and a hub 10 which is transversely bored to receive an arbor 11 extending between the front and rear walls 12, 13, of the casing. By means of this arbor the casing is pivotally suspended from the casting. In the particular form shown the casing consists of circular front and rear frames 12, 13, each formed with a diametrical bar 14 for a purpose to be presently described, connected at suitable intervals by cross-rods 15, 15 and a cross-bar 16. The scale pan 17 is suspended from the casing at a point sufficiently remote from the arbor to give the necessary leverage, the connection in the example of the invention under discussion comprising a link or hook rod 18 connected at its lower end to a ring 19 upon the scale pan bail 20 and its upper end hooked through a yoke 21 suspended from a knife edge pivot 22 carried by a bracket 23 which spans the front and rear walls of the casing.

The form of the bracket is best shown in Fig. 2 and it comprises enlarged portions 24, 24, which surround the arbor 11 about which the bracket is adjustable by means of the slot 25 and screw 26. The diametrical bars 14, above referred to, are perforated in register to receive the shaft 27 of the indicator hand 28. The shaft 27 has fixed thereon a pinion 29 which meshes with the rack 6 above described. Upon the cross bar 16 is mounted an air dashpot 31 of any ordinary or approved construction, the piston 32 of which is formed with a by-pass and connected by the rod 33 with the arm 9 of the casting above mentioned.

In the operation of the scale the casting is substantially fixed in the position shown in Figs. 1 and 4, by reason of the weight of the suspended parts. The casing, however, constitutes a pendulum lever as stated above, and when a load is put upon the scale pan it exerts a pull upon the casing through the link and bracket above described which swings the casing about the arbor 11 until its center of gravity has been so displaced that the weight of the casing under the leverage employed counterbalances or offsets the load on the scale pan. Fig. 4 shows the casing swung upward by placing a weight in the scale pan which, as illustrated, equals the reading capacity of the scale. As the casing swings about its point of suspension the pinion 29 travels along the stationary rack 6 which is concentric with the point of suspension of the casing, and the hand is thereby revolved to indicate the weight on the scale pan, the dashpot in the meantime preventing violent movements of the parts. It will thus be seen that the casing and its contained parts constitute the pendulum of the scale thus dispensing with a distinct and separate pendulum and furnishing a scale which may be readily shipped or subjected to rough treatment without damage.

In the construction shown in Fig. 5, the casing is again used as the pendulum weight for offsetting the weight of the load, though the action is somewhat different from that of the above described scale. In this case the casting which comprises the rack segment 6' is itself hung upon knife edge bearings 33, 34, and constitutes the pendulum. Said knife edge bearings are received in the eyes of a loop 35 which may be suspended in any suitable manner, and the casting is enlarged at 36 and cross-bored to receive the arbor 37 of the casing which is thus pivotally suspended from the casting. To the arm 38, formed integral with the casting, is attached the link 39 which, as shown, is connected at its lower end to a beam 40 of the scale, though obviously, if desired, a scale pan could be suspended from the link 39. The casing, as in the earlier described form of the scale, carries a dial with which a hand 28' mounted on a spindle 27' coöperates and the last-named element also carries as in the other form of the device, a pinion 29', which coöperates with a rack 6' of the casting. A dashpot 31' attached to some stationary part of the scale regulates the movement of the parts. It will be readily seen that the casting suspended by the knife edge bearing 34 constitutes the pendulum, of which the pivoted casing is the weight and that draft upon the arm 38 swings the casting and the suspended casing, the latter, however, maintaining its position with the zero marking uppermost by swinging upon its arbor. As the casting is deflected from its normal position the rack 6' turns the pinion 29' and shifts the indicating hand 28' to a position indicating the load upon the scale pan.

It will be observed that in general principle of operation the form of scale shown in Fig. 6 resembles that of Fig. 5, though it differs therefrom in some details which will be referred to later. The casing and dial are substantially identical with the similar elements of the scale just described. A pendulum member 41 is pivoted to the casing at 37" and provided with a rack segment 6" engaging a gear 29" upon the spindle of said indicator hand. The pendulum member 41 is suspended by knife edges 34" from a loop 35" which is adapted to be suspended from any suitable support. Said loop is formed upon its opposite ends with enlargements 42 which are perforated to receive the knife edges 34" above mentioned. The latter, as shown more particularly in Fig. 7, are formed on a cylindrical trunnion member 43 to which is rigidly secured the upper end of the pendulum member 41, the latter being transversely bored for this purpose. The head 44 of said pendulum member in which the trunnion is secured is bifurcated or slotted at 45 to receive an arm 46 which is angularly adjustable around the trunnion. From this arm the loop 47 is suspended and the link 48 connects the latter with the load receiver of the scale, directly in the case of a hanging scale and indirectly in the case of a beam scale. A correct adjustment between the pendulum member 41 and said arm is secured by the following device. The pendulum member is formed or provided with oppositely extending ears 49, 49, which are perforated and tapped to receive screws 50, 50, the ends of which bear upon seats 51, 51 formed on the arm. By easing one screw and tightening up on the other any adjustment between the parts within the narrow limits required may be obtained. A link 52 is pivoted at 53 to the casing and at 54 to the link 48 to properly guide and maintain the position of the latter and the dashpot 31" in this construction is secured to the casing in a normally inclined position and its piston 32" connected by a rod 33" with said link 48 to restrain unnecessary movement of the parts whether in a vertical or horizontal direction.

I claim:

1. In a weighing scale, an indicator casing, a member from which said casing is pivotally suspended, indicator mechanism within said casing, connections between said indicator mechanism and said member whereby movement of the casing about its pivot operates the indicator mechanism, a load receiver, and connections therefrom whereby the addition of a load to the receiver causes the casing to revolve upon its pivot.

2. In a weighing scale, a casing, a member from which said casing is pivotally suspended, indicator mechanism in said casing, rack and pinion connection between said indicator mechanism and the suspension member whereby the movement of the casing about its pivot operates the indicator mechanism, a load receiver, and connections therefrom whereby the addition of load to the receiver rotates the casing with reference to the suspension member.

3. In a weighing scale, a casing, a suspension member, a pivotal connection between said casing and suspension member, a rack on the suspension member eccentric to said pivotal connection, indicator mechanism carried by the casing, a pinion for operating said mechanism engaging said rack, a load receiver, and connections therefrom whereby the addition of load to the receiver causes the casing to be revolved upon its pivotal connection.

4. In a weighing scale, a casing, a suspension member to which said casing is pivoted, a load receiver connected to said casing eccentric to its pivotal suspension, indicator mechanism within the casing and connections from the indicator mechanism to said suspension member whereby the swinging of the casing causes the rotation of the indicator mechanism.

5. In a weighing scale, a casing, a supporting member to which the casing is eccentrically pivoted, a load receiver connected to the casing eccentric to its axis of support, indicator mechanism contained in the casing, and connections from the indicator mechanism to the support whereby the swinging of the casing upon its pivot operates the indicator mechanism.

6. In a weighing scale, a casing, a support therefor to which the casing is pivoted, a load receiver pivoted to the casing eccentric to the pivot of the latter, indicator mechanism in the casing, and rack and pinion connection between said mechanism and the support.

7. In a weighing scale, a casing, a support to which the latter is pivotally connected, an arcuate rack on the support concentric with the pivotal pin, an indicator carried by the casing, a pinion on the indicator meshing with the rack, a load receiver, and connections from the load receiver to a point on the casing eccentric to its point of support.

8. In a weighing scale, a support, a circular casing eccentrically pivoted to the said support, an arcuate rack on the support concentric to the casing pivot, indicating means in the casing, a pinion on the indicating means meshing with said rack, a load receiver, and connections therefrom to a point on the casing eccentric to its point of suspension.

9. In a weighing scale, a circular casing, a support from which said casing is eccentrically suspended, an arcuate rack on said support, a pinion in the casing in mesh with the rack, an indicator driven by the pinion, a bracket adjustably mounted in the casing, a load receiver, and connections from said bracket to the load receiver.

10. In a weighing scale, a supporting member comprising an arm 9, an arcuate rack 6 and a hub 10, a circular casing, an arbor mounted in said casing and extending through said hub, a bracket having arms surrounding said arbor and provided with slots 25, adjusting screws 26 extending through said slots and in the walls of the casing, a yoke 21 connected to the bracket, and a load receiver connected to the yoke.

11. In a weighing scale, a casing, a support to which the casing is pivotally connected, an arm on the support, a dashpot in the casing having a piston, a piston-rod 33 connecting said piston and arm 9, an arcuate rack formed on said support, an indicator pivoted in the casing, a pinion for revolving said indicator meshing with the rack, a load receiver, and connections from the load receiver to a point on the casing eccentric to its point of suspension.

CLARENCE H. HAPGOOD.

Witnesses:
 CLARENCE W. FESSENDEN,
 H. T. BERGEN.